United States Patent Office 3,646,135
Patented Feb. 29, 1972

3,646,135
UREA DYES
Robert F. Coles, East Oakdale Township, Washington County, and Norman P. Sweeny, North Oaks Village, Minn., assignors to Minnesota Mining and Manufacturing Company, St. Paul, Minn.
No Drawing. Filed Sept. 18, 1967, Ser. No. 668,708
Int. Cl. C07c *127/00*
U.S. Cl. 260—553 A          13 Claims

ABSTRACT OF THE DISCLOSURE

Novel protonatable color precursors are produced by reaction of auramine with alkyl or aryl isocyanates.

---

This invention relates to novel dye-forming compounds and to methods of making the same.

The addition of phenyl isothiocyanate to auramine with formation of the intensely colored yellow compound $$((CH_3)_2N\text{---}C_6H_4)_2C\text{=}N\text{---}CS\text{---}NH\text{---}C_6H_5$$

has been described by Finckh and Schwimmer, see J. Prakt. Chem. (2), 50 400–445. On being treated with acid the compound first changes from yellowish to reddish in color and then rapidly decomposes, e.g. to tetramethyldiaminobenzophenone.

The present invention is concerned with the preparation of much less intensely colored or substantially colorless compounds which likewise are capable of conversion by simple protonation to visibly distinct and strongly colored compounds and accordingly possess utility in various imaging or copying processes as will be hereinafter described.

It has now been found possible to obtain colorless or faintly colored protonatable color-forming compounds, having the capabilities just indicated, by the reaction of certain isocyanates with imino compounds such as auramine or auramine base to form substituted methylene ureas, in accordance with the equation $$(R_2N\text{---}C_6H_4)_2C\text{=}NH + R'\text{---}N\text{=}C\text{=}O \longrightarrow$$

$$(R_2N\text{---}C_6H_4)_2C\text{=}N\text{---}\overset{O}{\underset{\parallel}{C}}\text{---}NH\text{---}R'$$

wherein R is methyl or ethyl, and R' may be alkyl, aryl, or substituted alkyl or aryl.

Examples of specific R' groups include $C_6H_5$—, p—$CH_3 \cdot C_6H_4$—, p—$C_2H_5O \cdot C_6H_4$, $C_2H_5OCOCH_2$—, (n)—$C_4H_9$, $C_{18}H_{37}$—.

Equivalent dimeric compounds, in which the R' group is difunctional, may be similarly prepared. Examples of specific difunctional R' groups are —CH=CH— and —$C_6H_4$—$CH_2$—$C_6H_4$—.

The substituted methylene ureas may additionally be hydrogenated to form substituted ureas, represented by the structural formula $$(R_2N\text{---}C_6H_4)_2CH\text{---}NH\text{---}CO\text{---}NHR'$$

while still retaining their ability to form distinct color bodies by protonation.

Thus, included in the present invention are those compounds having the formula

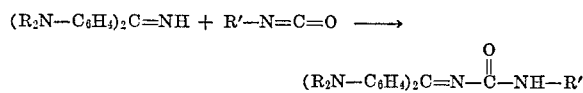

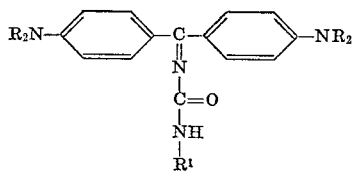

or

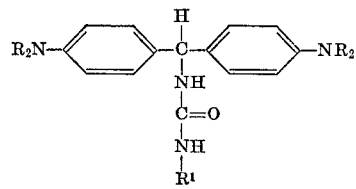

wherein R is methyl or ethyl and $R^1$ is alkyl of 4 to 18 carbons, phenyl,

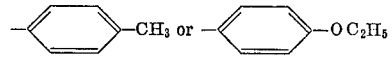

Where auramine base serves as the one reactant, reaction is readily achieved by simply mixing with the desired isocyanate in solution in an inert liquid such as toluene or benzene, either at room temperature or preferably with moderate heating to speed up the reaction. The product precipitates in the form of finely divided crystals having no more than a faint tan or buff coloration, which are recovered by filtration or centrifugation, washed and dried. Substitution of auramine for the auramine base makes necessary the further addition of an acid acceptor such as triethylamine. Since auramine is itself a yellow dye, it is ordinarily preferred to employ the substantially colorless auramine base as the reactant material. The base is preferably used in purified form, any insoluble impurities being first removed so that the final product crystallizes readily for easy and effective recovery.

For an illustration of the utility of the compounds of this invention, reference is made to copending United States application Ser. No. 590,211, filed Oct. 28, 1966 now U.S. Pat. 3,483,013 (issued Dec. 9, 1969), wherein is described a receptor copy-sheet comprising a coating on a transparent film support of a polymeric vinyl chloride binder containing a color precursor material which may be a protonatable compound as herein described. Transfer of a proton donor material, e.g. salicylic acid, from a source sheet to the receptor sheet at image areas results in the development of a visibly distinct projectable color image which is found to have a surprisingly high resistance to fading under prolonged intense illumination, as in the projection of colored images from overhead projectors.

EXAMPLE 1

Preparation of a substituted methylene urea

A solution made by mixing 277.1 grams of auramine base into 3,000 ml. of toluene at 100–105° C. is filtered, with removal of about 1.4 grams of insoluble material. To the solution, now at 58° C., is added with moderate stiring 109 grams of normal butyl isocyanate. No appreciable exotherm occurs. Precipitation begins within about 15 minutes. After one hour the mixture is cooled to room temperature and filtered. The filtrate is washed with toluene and with hexane, and dried in vacuo at 65–70° C. The product is a pale tan powder melting at 161–162° C. When the material is coated in a polymeric vinyl chloride binder from solution onto a paper or other carriers and the dried sheet is then contacted with salicylic acid fumes, the coating immediately becomes bright red and the color is retained during prolonged storage and under exposure to intense light. A bright red color is obtained also on adding a small portion of the powder to glacial acetic acid.

Auramine base has the formula $$((CH_3)_2N \cdot C_6H_4)_2C\text{=}NH$$

The formula of the reaction product is $$((CH_3)_2N\text{---}C_6H_4)_2C\text{=}N\text{---}CO\text{---}NH\text{---}nC_4H_9$$

EXAMPLE 2

Preparation of a substituted urea

The compound N - phenyl - N'-(bis(4-dimethylaminophenyl)-methylene) urea, having the formula

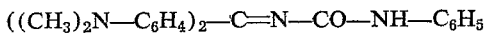

is prepared from auramine base and phenylisocyanate in accordance with the procedure of Example 1, and is recovered in the form of crystals melting at 214–215° C. and having a faint tan or buff color. A 25-gram portion of the crystals is charged to a pressure vessel, together with 5 grams of Raney nickel catalyst (freshly washed with ethanol), and 100 ml. of dimethylformamide. The vessel is purged with hydrogen and is then filled with hydrogen to a pressure of 600 p.s.i., heated to 80° C., and held at that temperature for 4½ hours. The reaction mixture is removed, diluted with 750 ml. of acetone, and filtered to remove the catalyst. The reaction product is precipitated by addition of 750 ml. of petroleum ether, and is recovered by filtration and dried. The dry product is in the form of very small, white (colorless) needles which melt at 212.5–213.0° C. It is indentified as

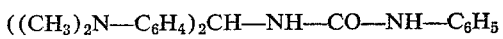

Contact with glacial acetic acid or with the fumes of salicylic acid converts a sample of the product to a deep blue color material.

Compounds are prepared by the procedures as above described but using equivalent amounts of other isocyanates R'N=C=O, as indicated in the following tabulation, wherein are included the compounds of Examples 1 and 2 for easy reference.

| R' | Initial product, M.P. °C. | Hydrogenated product, M.P. °C. |
|---|---|---|
| —C₆H₅ | 214–215 | 212.5–213 |
| —C₆H₄.CH₃ | 206–208 | 211–212 |
| —C₆H₄.OC₂H₅ | 192–194 | 188–189 |
| —nC₄H₉ | 161–162 | About 190 |
| —CH₂CO₂C₂H₅ | 183–184 | 194–196 |
| —C₁₈H₃₇ | 118–120 | 146–150 |
| (—CH=CH—)½ | 201–203 | |
| (—C₆H₄.CH₂.C₆H₄—)½ | 180–188 | |

The octadecyl compounds (R'=—C₁₈H₃₇), in addition to being substantially free of color, have a melting point well within the temperature range normally available in thermographic copying techniques.

What is claimed is as follows:

1. A compound having the formula

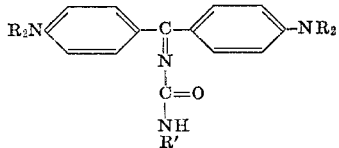

or

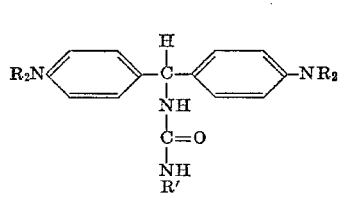

wherein R is methyl or ethyl and R' is alkyl of 4 to 18 carbons, phenyl, $-\bigcirc-CH_3$, or $-\bigcirc-OC_2H_5$ 2. A compound as defined in claim 1 having the formula

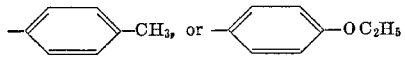

3. A compound as defined in claim 1 having the formula

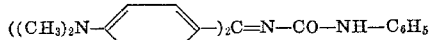

4. A compound as defined in claim 1 having the formula

5. A compound as defined in claim 1 having the formula

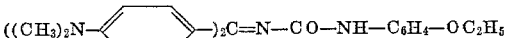

6. A compound as defined in claim 1 having the formula

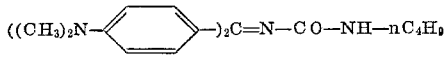

7. A compound as defined in claim 1 having the formula

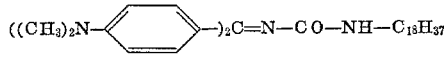

8. A compound as defined in claim 1 having the formula

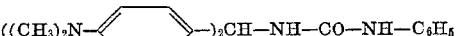

9. A compound as defined in claim 1 having the formula

10. A compound as defined in claim 1 having the formula

11. A compound as defined in claim 1 having the formula

12. A compound having the formula

13. A compound having the formula

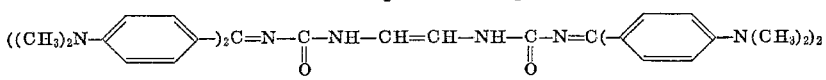

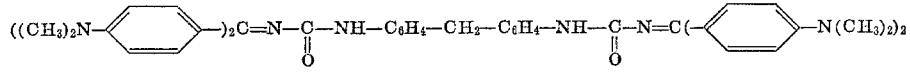

References Cited

UNITED STATES PATENTS 2,725,385  11/1955  Seeger et al. _____ 260—553

BERNARD HELFIN, Primary Examiner

M. W. GLYNN, Assistant Examiner

U.S. Cl. X.R.

117—36.2, 155 UA